United States Patent
Dai et al.

(10) Patent No.: US 10,602,404 B2
(45) Date of Patent: *Mar. 24, 2020

(54) DATA OFFLOADING METHOD AND BASE STATION

(71) Applicant: Huawei Technologies Co., Ltd., Shenzhen (CN)

(72) Inventors: Mingzeng Dai, Shanghai (CN); Jian Zhang, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,504

(22) Filed: Apr. 20, 2018

(65) Prior Publication Data

US 2018/0242195 A1 Aug. 23, 2018

Related U.S. Application Data

(63) Continuation of application No. 15/276,439, filed on Sep. 26, 2016, now Pat. No. 9,980,176, which is a
(Continued)

(51) Int. Cl.
*H04W 28/08* (2009.01)
*H04W 36/08* (2009.01)
(Continued)

(52) U.S. Cl.
CPC ............ *H04W 28/08* (2013.01); *H04W 36/08* (2013.01); *H04W 56/0015* (2013.01); *H04W 88/16* (2013.01)

(58) Field of Classification Search
CPC .................................................... H04W 4/043
(Continued)

(56) References Cited

U.S. PATENT DOCUMENTS

2010/0118844 A1\* 5/2010 Jiao ..................... H04W 24/02
370/338
2012/0039304 A1 2/2012 Kim et al.
(Continued)

FOREIGN PATENT DOCUMENTS

CN 102098798 A 6/2011
CN 102422673 A 4/2012
(Continued)

OTHER PUBLICATIONS

Alcatel-Lucent et al.; "LIPA/SIPTO Support in dual connectivity (SA2 point 9)"; 3GPP TSG-RAN WG3 Meeting #83; R3-140256; Prague, Czech Republic; Feb. 10-14, 2014; 5 pages.
(Continued)

*Primary Examiner* — Joel Ajayi
(74) *Attorney, Agent, or Firm* — Fish & Richardson P.C.

(57) ABSTRACT

Embodiments of the present invention provide a data offloading method and a base station. The method includes: sending, by a master base station, a first request message to a mobility management control node, where the first request message includes an address of a local gateway of a secondary base station, and the first request message is used to request to perform data offloading at the local gateway of the secondary base station; receiving, by the master base station, a first response message that is sent by the mobility management control node according to the first request message, where the first response message includes a first related identifier (ID) of the local gateway of the secondary base station, and the first related ID is used to indicate a first bearer according to which data offloading is performed at the local gateway of the secondary base station.

10 Claims, 5 Drawing Sheets

Related U.S. Application Data continuation of application No. PCT/CN2014/074150, filed on Mar. 27, 2014.

(51) Int. Cl.
*H04W 56/00* (2009.01)
*H04W 88/16* (2009.01)

(58) Field of Classification Search
USPC .................................................. 455/438, 453
See application file for complete search history.

(56) References Cited

U.S. PATENT DOCUMENTS

| | | |
|---|---|---|
| 2012/0300638 A1 | 11/2012 | Zhou et al. |
| 2014/0082697 A1 | 3/2014 | Wafta et al. |
| 2014/0119340 A1 | 5/2014 | Stojanovski et al. |

FOREIGN PATENT DOCUMENTS

| | | |
|---|---|---|
| CN | 102958102 A | 3/2013 |
| CN | 103052117 A | 4/2013 |
| JP | 2017513427 A | 5/2017 |
| KR | 10-2014-0030301 A | 3/2014 |
| WO | 2009070061 A1 | 6/2009 |
| WO | 2010/128773 A2 | 11/2010 |
| WO | 2012/135793 A2 | 10/2012 |
| WO | 2012/177024 A1 | 12/2012 |
| WO | 2013155709 A1 | 10/2013 |
| WO | 2015138908 A2 | 9/2015 |

OTHER PUBLICATIONS

LG Electronics Inc.; "Specific issues on E-RAB management and Bearer Type"; 3GPP TSG-RAN WG3 Meeting #83; R3-140280; Prague, Czech Republic; Feb. 10-14, 2014; total 4 pages.

NEC Corporation; "Relevance of LIPA/SIPTO in SCE U-plane architecture discussions"; 3GPP TSG-RAN2 Meeting R2-131999; Fukuoka, Japan; May 20-24, 2013; 4 pages.

Samsung; Discussion on SeNB local break-out using LIPA and SIPTO@LN; 3GPP TSG-RAN WG2 #83Bis; R2-133129; Ljubljana, Slovenia; Oct. 7-11, 2013; 3 pages.

Nsn et al. "Discussion on local IP breakout for small cell enhancement"; 3GPP TSG-RAN WG2 Meeting #83; R2-132414, Aug. 19-23, 2013; 3 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 v12.1.0, Mar. 2014, 209 pages.

"3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 v12.1.0, Mar. 2014, 285 pages.

"3rd Generation Partnership Project; Technical Specification Group Radio Access Network; Evolved Universal Terrestrial Radio Access Network (E-UTRAN); X2 application protocol (X2AP) (Release 12)", 3GPP TS 36.423 v12.1.0, Mar. 2014, 144 pages.

\* cited by examiner

DATA OFFLOADING METHOD AND BASE STATION

CROSS-REFERENCE TO RELATED APPLICATIONS

This application is a continuation of U.S. patent application Ser. No. 15/276,439 filed on Sep. 26, 2016, which is a continuation of International Application No. PCT/CN2014/074150 filed on Mar. 27, 2014. All of the aforementioned patent applications are hereby incorporated by reference in their entireties.

TECHNICAL FIELD

Embodiments of the present invention relate to the communications field, and in particular, to a data offloading method and a base station.

BACKGROUND

With development of a mobile communications system, the system can provide an increasingly high transmission rate and increasingly high service quality, but user services also impose an increasingly high requirement on the transmission rate. To ensure a rate for general users without a substantial increase in a configured bandwidth, and also provide a higher throughput to some users, a carrier aggregation (Carrier Aggregation, "CA" for short) technology is introduced in the 3rd Generation Partnership Project (3rd Generation Partnership Project, "3GPP" for short). The carrier aggregation technology refers to that user equipment (User Equipment, "UE" for short) may simultaneously use multiple component carriers (Component Carrier, "CC" for short) to perform uplink or downlink communication, so as to support high speed data transmission. When a user rate decreases, some component carriers may be released, and only one resident carrier is reserved. A released transmission resource can be used by another user, thereby achieving an objective of flexibly and dynamically using a network resource.

Long Term Evolution (Long Term Evolution, "LTE" for short) is Long Term Evolution (Long Term Evolution) in a Universal Mobile Telecommunications System (Universal Mobile Telecommunication System, "UMTS" for short) technology that is specified by the 3GPP organization. Carrier aggregation of an LTE system may be roughly classified into intra-base station cell aggregation, inter-base station cell aggregation, and the like. Release Release-10 of the 3GPP supports the intra-base station cell aggregation. The inter-base station cell aggregation may be further classified into cell aggregation between macro base stations and cell aggregation between a macro base station and a small cell (Small Cell). The cell aggregation between macro base stations can improve a data throughput of a user at an edge of the base station, thereby improving user experience. In addition to improvement of a data throughput of a user, the aggregation between a macro base station and a small cell can further reduce system load of a network of the macro base station, and also reduce occurrence of a handover compared with a pure small cell. This technology is generally referred to as a Multiple Stream Aggregation technology (Multiple Stream Aggregation, "MSA" for short).

In a current carrier aggregation technology, users are all connected to the Internet by using a core network of an operator. Therefore, increases in a quantity of users and data traffic result in heavy load of the core network of the operator.

SUMMARY

According to a data offloading method and a base station in embodiments of the present invention, when a user data throughput is improved, load on a mobile network can be reduced, thereby effectively improving satisfaction in user experience.

According to a first aspect, a base station is provided, where the base station includes:

a first sending module, configured to send a first request message to a mobility management control node, where the first request message includes an address of a local gateway of a secondary base station, and the first request message is used to request to perform data offloading at the local gateway of the secondary base station;

a receiving module, configured to receive a first response message that is sent by the mobility management control node according to the first request message sent by the first sending module, where the first response message includes a first related identifier ID of the local gateway of the secondary base station, and the first related ID is used to indicate a first bearer according to which data offloading is performed at the local gateway of the secondary base station; and a second sending module, configured to send a second request message including the first related ID to the secondary base station according to the first response message received by the receiving module, to instruct the secondary base station to perform data offloading at the local gateway of the secondary base station according to the first bearer.

With reference to the first aspect, in a first possible implementation manner of the first aspect, the first sending module is specifically configured to send the first request message to the mobility management control node when it is determined that the local gateway of the secondary base station is a co-site local gateway.

With reference to the first aspect, in a second possible implementation manner of the first aspect, the first sending module includes:

a first determining unit, configured to determine that the local gateway of the secondary base station is an independent local gateway; and a first sending unit, configured to send the first request message to the mobility management control node when it is determined that the address of the local gateway of the secondary base station is the same as an address of a local gateway of the master base station.

With reference to the first or second possible implementation manner of the first aspect, in a third possible implementation manner of the first aspect, the second request message sent by the second sending module is further used to instruct the secondary base station to perform data offloading according to all traffic of the first bearer.

With reference to the third possible implementation manner of the first aspect, in a fourth possible implementation manner of the first aspect, the first sending module is further configured to: in a case in which it is determined that the first sending module receives a response message that is sent by the secondary base station and that is used to indicate that the secondary base station completes data offloading according to all the traffic of the first bearer, send a first indication message to the mobility management control node, where the first indication message is used to indicate that data offloading is completed at the local gateway of the secondary base station according to the first bearer.

With reference to the second possible implementation manner of the first aspect, in a fifth possible implementation manner of the first aspect, the second sending module includes:

a second determining unit, configured to determine, according to the first bearer that is indicated by the first related ID in the first response message, first traffic according to which data offloading is performed at the local gateway of the secondary base station and second traffic according to which data offloading is performed at the local gateway of the master base station, where a sum of the first traffic and the second traffic does not exceed all traffic of the first bearer; and a second sending unit, configured to send the second request message to the secondary base station, where the second request message further includes the first traffic, and is used to instruct the secondary base station to perform data offloading at the local gateway of the secondary base station according to the first traffic; and the base station further includes:

a first offloading module, configured to perform data offloading at the local gateway of the master base station according to the second traffic determined by the second determining unit.

With reference to the fifth possible implementation manner of the first aspect, in a sixth possible implementation manner of the first aspect, the first sending module is further configured to: in a case in which it is determined that data offloading is completed according to the second traffic and it is determined that the receiving module receives a response message that is sent by the secondary base station and that is used to indicate that the secondary base station completes data offloading according to the first traffic, send a second indication message to the mobility management control node, where the second indication message is used to indicate that data offloading is completed at the local gateway of the secondary base station according to the first bearer.

With reference to the first possible implementation manner of the first aspect, in a seventh possible implementation manner of the first aspect, the first request message sent by the first sending module further includes an address of a local gateway of the master base station, and the first request message is further used to request to perform data offloading at the local gateway of the master base station;

the first response message received by the receiving module further includes a second related ID of the local gateway of the master base station, and the second related ID is used to indicate a second bearer according to which data offloading is performed at the local gateway of the master base station; and the base station further includes:

a second offloading module, configured to perform data offloading at the local gateway of the master base station according to the second bearer that is indicated by the second related ID in the first response message received by the receiving module.

With reference to the seventh possible implementation manner of the first aspect, in an eighth possible implementation manner of the first aspect, the first sending module is further configured to: in a case in which it is determined that data offloading is completed according to the second bearer and it is determined that the receiving module receives a fourth response message that is sent by the secondary base station and that is used to indicate that the secondary base station completes data offloading according to the first bearer, send a third indication message to the mobility management control node, where the third indication message is used to indicate that local offloading is separately completed according to the first bearer and the second bearer.

With reference to the first aspect and any possible implementation manner of the first to eighth possible implementation manners of the first aspect, in a ninth possible implementation manner of the first aspect, the receiving module is further configured to: before the first sending module sends the first request message to the mobility management control node, receive the address of the local gateway of the secondary base station that is sent by the secondary base station.

According to a second aspect, a base station is provided, where the base station includes:

a receiving module, configured to receive a request message sent by a master base station, where the request message includes a first related identifier ID of a local gateway of the secondary base station, and the first related ID is used to indicate a first bearer according to which data offloading is performed at the local gateway of the secondary base station; and an offloading module, configured to perform data offloading according to the first bearer indicated by the first identifier ID that is included in the request message received by the receiving module.

With reference to the second aspect, in a first possible implementation manner of the second aspect, the local gateway of the secondary base station is a co-site local gateway or an independent local gateway.

With reference to the second aspect or the first possible implementation manner of the second aspect, in a second possible implementation manner of the second aspect, the base station further includes:

a first sending module, configured to: before the receiving module receives the request message sent by the master base station, send an address of the local gateway of the secondary base station to the master base station, so that the master base station sends the address of the local gateway of the secondary base station to the mobility management control node, to request to perform data offloading.

With reference to the second aspect or the first or second possible implementation manner of the second aspect, in a third possible implementation manner of the second aspect, the base station further includes:

a second sending module, configured to: when data offloading is completed according to the request message received by the receiving module, send, to the master base station, a response message used to indicate that data offloading is completed.

According to a third aspect, a data offloading method is provided, where the method includes:

sending, by a master base station, a first request message to a mobility management control node, where the first request message includes an address of a local gateway of a secondary base station, and the first request message is used to request to perform data offloading at the local gateway of the secondary base station;

receiving, by the master base station, a first response message that is sent by the mobility management control node according to the first request message, where the first response message includes a first related identifier ID of the local gateway of the secondary base station, and the first related ID is used to indicate a first bearer according to which data offloading is performed at the local gateway of the secondary base station; and sending, by the master base station, a second request message including the first related ID to the secondary base station according to the first response message, to instruct the secondary base station to perform data offloading at the local gateway of the secondary base station according to the first bearer.

With reference to the third aspect, in a first possible implementation manner of the third aspect, the sending, by a master base station, a first request message to a mobility management control node includes:

sending, by the master base station, the first request message to the mobility management control node when determining that the local gateway of the secondary base station is a co-site local gateway.

With reference to the third aspect, in a second possible implementation manner of the third aspect, the sending, by a master base station, a first request message to a mobility management control node includes:

determining, by the master base station, that the local gateway of the secondary base station is an independent local gateway; and when determining that the address of the local gateway of the secondary base station is the same as an address of a local gateway of the master base station, sending, by the master base station, the first request message to the mobility management control node.

With reference to the first or second possible implementation manner of the third aspect, in a third possible implementation manner of the third aspect, the sending, by the master base station, a second request message including the first related ID to the secondary base station according to the first response message includes:

sending, by the master base station, the second request message to the secondary base station, where the second request message is used to instruct the secondary base station to perform data offloading according to all traffic of the first bearer.

With reference to the third possible implementation manner of the third aspect, in a fourth possible implementation manner of the third aspect, the method further includes:

in a case in which the master base station determines that the master base station receives a response message that is sent by the secondary base station and that is used to indicate that the secondary base station completes data offloading according to all the traffic of the first bearer, sending, by the master base station, a first indication message to the mobility management control node, where the first indication message is used to indicate that data offloading is completed at the local gateway of the secondary base station according to the first bearer.

With reference to the second possible implementation manner of the third aspect, in a fifth possible implementation manner of the third aspect, the sending, by the master base station, a second request message including the first related ID to the secondary base station according to the first response message includes:

determining, by the master base station according to the first bearer that is indicated by the first related ID in the first response message, first traffic according to which data offloading is performed at the local gateway of the secondary base station and second traffic according to which data offloading is performed at the local gateway of the master base station, where a sum of the first traffic and the second traffic does not exceed all traffic of the first bearer; and sending, by the master base station, the second request message to the secondary base station, where the second request message further includes the first traffic, and is used to instruct the secondary base station to perform data offloading at the local gateway of the secondary base station according to the first traffic; and the method further includes:

performing, by the master base station, data offloading at the local gateway of the master base station according to the second traffic.

With reference to the fifth possible implementation manner of the third aspect, in a sixth possible implementation manner of the third aspect, the method further includes: in a case in which the master base station determines that data offloading is completed according to the second traffic, and determines that the master base station receives a response message that is sent by the secondary base station and that is used to indicate that the secondary base station completes data offloading according to the first traffic, sending, by the master base station, a second indication message to the mobility management control node, where the second indication message is used to indicate that data offloading is completed at the local gateway of the secondary base station according to the first bearer.

With reference to the first possible implementation manner of the third aspect, in a seventh possible implementation manner of the third aspect, the sending, by the master base station, the first request message to the mobility management control node when determining that the local gateway of the secondary base station is a co-site local gateway includes:

sending, by the master base station, the first request message to the mobility management control node, where the first request message includes an address of a local gateway of the master base station, and the first request message is further used to request to perform data offloading at the local gateway of the master base station;

the receiving, by the master base station, a first response message that is sent by the mobility management control node according to the first request message includes:

receiving, by the master base station, the first response message, where the first response message further includes a second related ID of the local gateway of the master base station, and the second related ID is used to indicate a second bearer according to which data offloading is performed at the local gateway of the master base station; and the method further includes:

performing, by the master base station, data offloading at the local gateway of the master base station according to the second bearer indicated by the second related ID.

With reference to the seventh possible implementation manner of the third aspect, in an eighth possible implementation manner of the third aspect, the method further includes:

in a case in which the master base station determines that data offloading is completed according to the second bearer, and determines that the master base station receives a fourth response message that is sent by the secondary base station and that is used to indicate that the secondary base station completes data offloading according to the first bearer, sending, by the master base station, a third indication message to the mobility management control node, where the third indication message is used to indicate that local offloading is separately completed according to the first bearer and the second bearer.

With reference to the third aspect and any possible implementation manner of the first to eighth possible implementation manners of the third aspect, in a ninth possible implementation manner of the third aspect, before the sending, by a master base station, a first request message to a mobility management control node, the method further includes:

receiving, by the master base station, the address of the local gateway of the secondary base station that is sent by the secondary base station.

According to a fourth aspect, a data offloading method is provided, where the method includes:

receiving, by a secondary base station, a request message sent by a master base station, where the request message includes a first related identifier ID of a local gateway of the secondary base station, and the first related ID is used to indicate a first bearer according to which data offloading is performed at the local gateway of the secondary base station; and performing, by the secondary base station, data offloading according to the first bearer.

With reference to the fourth aspect, in a first possible implementation manner of the fourth aspect, the local gateway of the secondary base station is a co-site local gateway or an independent local gateway.

With reference to the fourth aspect or the first possible implementation manner of the fourth aspect, in a second possible implementation manner of the fourth aspect, before the receiving, by a secondary base station, a request message sent by a master base station, the method further includes:

sending, by the secondary base station, an address of the local gateway of the secondary base station to the master base station, so that the master base station sends the address of the local gateway of the secondary base station to the mobility management control node, to request to perform data offloading.

With reference to the fourth aspect or the first or second possible implementation manner of the fourth aspect, in a third possible implementation manner of the fourth aspect, the method further includes:

when completing data offloading according to the request message, sending, by the secondary base station to the master base station, a response message used to indicate that data offloading is completed.

Based on the foregoing technical solutions, according to the data offloading method and the base station in the embodiments of the present invention, a master base station sends an address of a local gateway of a secondary base station to a mobility management control node, and data offloading is performed at the local gateway of the secondary base station according to a related ID of the local gateway of the secondary base station that is sent by the mobility management control node, so that when a user data throughput is improved, load on a mobile network can be reduced, thereby effectively improving satisfaction in user experience.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
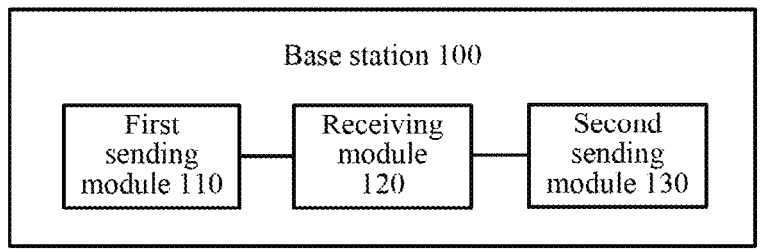
FIG. 1 is a schematic block diagram of a base station according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied to various communications systems, such as: a Global System for Mobile Communications (Global System of Mobile communication, "GSM" for short), a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, LTE time division duplex (Time Division Duplex, "TDD" for short), or a Universal Mobile Telecommunications System (Universal Mobile Telecommunication System, "UMTS" for short).

It should be further understood that a base station in the embodiments of the present invention may be a base station (Base Transceiver Station, BTS for short) in GSM or in CDMA, or may be a base station (Node B, NB for short) in WCDMA, or may be an evolved NodeB (evolutional Node B, e-NodeB or eNB for short) in LTE, or may be a home NodeB (Home Node B, HNB for short) or a home evolved NodeB (Home (evolved) Node B, H(e)NB for short), which is not limited in the present invention. However, for ease of description, a base station in the following embodiments is described by using an eNode B as an example.

It should be further understood that in the embodiments of the present invention, a mobility management control node may be a mobility management entity (Mobility Management Entity, "MME" for short), a serving gateway (Serving Gateway, "SGW" for short), or a packet data network gateway (Packet Gateway, "PGW" for short) in an LTE network, or may be a serving general packet radio service support node (Serving GPRS Support Node, "SGSN" for short) in a 3G network, which is not limited in the embodiments of the present invention.

It should be further understood that in the embodiments of the present invention, user equipment (User Equipment, "UE" for short) may be referred to as a terminal (Terminal), a mobile station (Mobile Station, "MS" for short), a mobile terminal (Mobile Terminal), or the like. The user equipment may communicate with one or more core networks by using a radio access network (Radio Access Network, "RAN" for short). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

It should be noted that the concepts of a master base station and a secondary base station are introduced according to the embodiments of the present invention. The master base station refers to a base station that UE initially accesses in a solution of carrier aggregation between base stations, and the secondary base station is a base station that is added by the master base station for the UE, for example, another serving base station except the master base station. Specifically, for example, UE accesses a primary cell (PCell) of a master base station, and the master base station determines to add a cell (that is, a secondary cell, SCell) of a secondary base station for the UE, and set up a bearer on the secondary base station.

Carrier aggregation (Carrier Aggregation, "CA" for short) refers to that UE may simultaneously use multiple component carriers (Component Carrier, "CC" for short) to perform uplink or downlink communication. In an existing LTE technology, one cell of a base station corresponds to one carrier. Specifically, for example, carrier aggregation in an LTE system may be roughly classified into intra-base station cell (cell) aggregation (or carrier aggregation), inter-base station cell aggregation, and the like. The intra-base station cell aggregation is controlled by only one base station. Specifically, for example, data of one service or one radio bearer (Radio Bearer, "RB" for short) may be delivered by using multiple cells of the base station. Release Release-10 of the 3GPP supports the cell (cell) aggregation (or carrier aggregation) in a base station. The inter-base station cell aggregation specifically refers to adding a carrier corresponding to a cell of another base station (a secondary base station) as a component carrier of carrier aggregation for UE that accesses a base station (a master base station). The inter-base station cell aggregation may be further classified into cell aggregation between macro base stations and cell aggregation between a macro base station and a small cell (Small cell). The cell aggregation between macro base stations can improve a data throughput of a user at an edge of the base station, thereby improving user experience. In addition to improvement of a data throughput of a user, the aggregation between a macro base station and a small cell can further offload system load of a macro network, and also reduce occurrence of a handover compared with a pure small cell. This technology is generally referred to as a Multiple Stream Aggregation technology (Multiple Stream Aggregation, "MSA" for short). Carrier aggregation mentioned in the embodiments of the present invention may involve in adding a cell of another base station for UE and/or adding a data radio bearer (DRB, Data Radio Bearer) on another base station for the UE.

It should be further noted that a method for implementing local offloading according to the embodiments of the present invention is applicable to carrier aggregation in a base station, or is applicable to carrier aggregation between base stations, for example, applicable to carrier aggregation between macro base stations or carrier aggregation between a macro base station and a micro base station (such as a Pico base station), a home NodeB (HeNB), or a base station of another type in a heterogeneous network (Heterogeneous network), which is not limited in the embodiments of the present invention. However, for ease of description, carrier aggregation in the following embodiments is described by using the carrier aggregation between macro base stations as an example.

FIG. 1 is a schematic block diagram of a base station 100 according to an embodiment of the present invention. The base station 100 shown in FIG. 1 may be configured to perform data offloading. Specifically, the base station 100 may be a master base station in a carrier aggregation technology, and the base station 100 includes a first sending module 110, a receiving module 120, and a second sending module 130.

The first sending module 110 is configured to send a first request message to a mobility management control node, where the first request message includes an address of a local gateway of a secondary base station, and the first request message is used to request to perform data offloading at the local gateway of the secondary base station.

The receiving module 120 is configured to receive a first response message that is sent by the mobility management control node according to the first request message sent by the first sending module, where the first response message includes a first related identifier ID of the local gateway of the secondary base station, and the first related ID is used to indicate a first bearer according to which data offloading is performed at the local gateway of the secondary base station.

The second sending module 130 is configured to send a second request message including the first related ID to the secondary base station according to the first response message received by the receiving module, to instruct the secondary base station to perform data offloading at the local gateway of the secondary base station according to the first bearer.

Therefore, according to the base station 100 in this embodiment of the present invention, the base station 100 sends an address of a local gateway of a secondary base station to a mobility management control node, and data offloading is performed at the local gateway of the secondary base station according to a related ID of the local gateway of the secondary base station that is sent by the mobility management control node, so that when a user data throughput is improved, load on a mobile network can be reduced, thereby effectively improving satisfaction in user experience.

It should be understood that the secondary base station according to this embodiment of the present invention may be a serving base station that is added by the base station 100 for UE.

The first sending module 110 sends the address (for example, an Internet Protocol (Internet Protocol, "IP" for short) address) of the local gateway (Local Gateway, "LGW" for short) of the secondary base station to the mobility management control node. The LGW of the secondary base station may be a co-site LGW or may be an independent LGW. A co-site LGW specifically refers to that the LGW is integrated in a base station, which is equivalent to that the local gateway LGW and the base station are co-sited. An independent LGW specifically refers to that the LGW is a local gateway that is not integrated in a base station and that is independent of the base station, that is, the independent LGW and the base station have different addresses. An independent LGW may be connected to multiple base stations by using a standard interface. For example, an independent LGW may be separately connected to the master base station and the secondary base station.

The receiving module 120 receives the first related ID of the LGW of the secondary base station that is sent by the mobility management control node. It should be understood that the first related ID indicates the first bearer of the LGW of the base station. Specifically, the secondary base station may acquire, by using the first related ID, the first bearer according to which data offloading is performed at the LGW of the secondary base station.

Optionally, in an embodiment, the first sending module is specifically configured to send the first request message to the mobility management control node when it is determined that the local gateway of the secondary base station is a co-site local gateway.

Specifically, when the LGW of the secondary base station is a co-site LGW, the receiving module of the base station 100 receives the first related ID sent by the mobility management control node, and may directly send the second request message including the first related ID to the secondary base station, to instruct the secondary base station to perform data offloading according to the first bearer indicated by the first related ID.

Optionally, in an embodiment, the second request message sent by the second sending module is further used to instruct the secondary base station to perform data offloading according to all traffic of the first bearer.

When completing data offloading according to the second request message based on all the traffic of the first bearer, the secondary base station may send a corresponding response message to the base station 100. The base station 100 may also send a corresponding indication message to the mobility management control node.

Optionally, in an embodiment, the first sending module is further configured to: in a case in which it is determined that the first sending module receives a response message that is sent by the secondary base station and that is used to indicate that the secondary base station completes data offloading according to all the traffic of the first bearer, send a first indication message to the mobility management control node, where the first indication message is used to indicate that data offloading is completed at the local gateway of the secondary base station according to the first bearer.

It should be understood that the first indication message may include the first related ID, and is used to notify the mobility management control node that local offloading is completed at the LGW of the secondary base station according to the first related ID.

Therefore, according to the base station 100 in this embodiment of the present invention, the base station 100 sends an address of a local gateway of a secondary base station to a mobility management control node, and data offloading is performed at the local gateway of the secondary base station according to a related ID of the local gateway of the secondary base station that is sent by the mobility management control node, so that when a user data throughput is improved, load on a mobile network can be reduced, thereby effectively improving satisfaction in user experience.

When the LGW of the secondary base station is an independent LGW, when it is determined that the address of the LGW of the secondary base station is the same as an address of an LGW of the base station 100, that is, when it is determined that the secondary base station and the base station 100 belong to a same local network, the first sending module 110 of the base station 100 sends the address of the LGW of the secondary base station to the mobility management control node, to request to perform data offloading.

Optionally, in an embodiment, the first sending module 110 includes:

a first determining unit 111, configured to determine that the local gateway of the secondary base station is an independent local gateway; and a first sending unit 112, configured to send the first request message to the mobility management control node when it is determined that the address of the local gateway of the secondary base station is the same as an address of a local gateway of the base station 100.

It should be understood that when the LGW of the secondary base station is an independent LGW, and the address of the LGW of the base station 100 is the same as the address of the independent LGW, that is, the independent LGW is separately connected to the base station 100 and the secondary base station, the base station 100 and the secondary base station have a same local gateway LGW. The receiving module 120 receives the first related ID of the LGW of the secondary base station that is sent by the mobility management control node, and the base station 100 may separately allocate, to the base station 100 and the secondary base station according to the first bearer indicated by the first related ID, traffic according to which data offloading is performed at the independent LGW. Specifically, the base station 100 may allocate a part of traffic in all the traffic of the first bearer to the secondary base station, and allocate the other part of the traffic to the base station 100, or may allocate all the traffic of the first bearer to the base station 100 or allocate all the traffic of the first bearer to the secondary base station, which is not limited in this embodiment of the present invention.

Optionally, in an embodiment, the second sending module 130 includes:

a second determining unit 131, configured to determine, according to the first bearer that is indicated by the first related ID in the first response message, first traffic according to which data offloading is performed at the local gateway of the secondary base station and second traffic according to which data offloading is performed at the local gateway of the base station 100, where a sum of the first traffic and the second traffic does not exceed all traffic of the first bearer; and a second sending unit 132, configured to send the second request message to the secondary base station, where the second request message further includes the first traffic, and is used to instruct the secondary base station to perform data offloading at the local gateway of the secondary base station according to the first traffic; and the base station 100 further includes:

a first offloading module 140, configured to perform data offloading at the local gateway of the base station 100 according to the second traffic determined by the second determining unit.

It should be understood that the sum of the first traffic that is determined by the second determining unit 131 of the base station 100 for the secondary base station to perform data offloading and the second traffic that is determined by the second determining unit 131 of the base station 100 for the base station 100 to perform data offloading should not exceed all the traffic indicated by the first bearer. For example, all the traffic indicated by the first bearer is 100 M, the first traffic is 60 M, and the second traffic may be 40 M or 30 M. The first bearer may be construed as maximum traffic that can be borne by an offloading channel of the LGW of the secondary base station.

After the base station 100 and the secondary base station separately complete data offloading, the base station 100 may send a corresponding indication message to the mobility management control node.

Optionally, in an embodiment, the first sending module is further configured to: in a case in which it is determined that data offloading is completed according to the second traffic and it is determined that the receiving module receives a response message that is sent by the secondary base station and that is used to indicate that the secondary base station completes data offloading according to the first traffic, send a second indication message to the mobility management control node, where the second indication message is used to indicate that data offloading is completed at the local gateway of the secondary base station according to the first bearer.

In a scenario in which the LGW of the secondary base station is an independent LGW, the base station 100 may also allocate, to the secondary base station, all the traffic indicated by the first related ID, that is, data offloading is performed at only the secondary base station.

Optionally, in an embodiment, the second request message sent by the second sending module is further used to instruct the secondary base station to perform data offloading according to all traffic of the first bearer.

When completing data offloading based on all the traffic of the first bearer, the secondary base station may send a corresponding response message to the base station 100. The base station 100 may also send a corresponding indication message to the mobility management control node.

Optionally, in an embodiment, the first sending module is further configured to: in a case in which it is determined that the first sending module receives a response message that is sent by the secondary base station and that is used to indicate that the secondary base station completes data offloading according to all the traffic of the first bearer, send a first indication message to the mobility management control node, where the first indication message is used to indicate that data offloading is completed at the local gateway of the secondary base station according to the first bearer.

Therefore, according to the base station 100 in this embodiment of the present invention, the base station 100 sends an address of a local gateway of a secondary base station to a mobility management control node, and data offloading is performed at the local gateway of the secondary base station according to a related ID of the local gateway of the secondary base station that is sent by the mobility management control node, so that when a user data throughput is improved, load on a mobile network can be reduced, thereby effectively improving satisfaction in user experience.

When the base station 100 also has an LGW, the first sending module 110 may also send an address of the LGW of the base station 100 to the mobility management control node, to request to perform data offloading.

Optionally, in an embodiment, the first request message sent by the first sending module further includes an address of a local gateway of the base station 100, and the first request message is further used to request to perform data offloading at the local gateway of the base station 100;

the first response message received by the receiving module further includes a second related ID of the local gateway of the base station 100, and the second related ID is used to indicate a second bearer according to which data offloading is performed at the local gateway of the base station 100; and the base station further includes:

a second offloading module 150, configured to perform data offloading at the local gateway of the base station 100 according to the second bearer that is indicated by the second related ID in the first response message received by the receiving module.

It should be understood that in this embodiment of the present invention, the base station 100 and the secondary base station can both implement data offloading, which can effectively reduce load of a mobile network.

After the base station 100 completes data offloading according to the second bearer, and the secondary base station completes data offloading according to all traffic of the first bearer, the base station 100 may send, to the mobility management control node by using the first sending module 110, an indication message indicating that the two base stations both complete data offloading.

Optionally, in an embodiment, the first sending module is further configured to: in a case in which it is determined that data offloading is completed according to the second bearer and it is determined that the receiving module receives a fourth response message that is sent by the secondary base station and that is used to indicate that the secondary base station completes data offloading according to the first bearer, send a third indication message to the mobility management control node, where the third indication message is used to indicate that local offloading is separately completed according to the first bearer and the second bearer.

Optionally, in an embodiment, the third indication message may include the first related ID and the second related ID, and is used to notify the mobility management control node that data offloading is completed according to the first related ID and the second related ID.

It should be further understood that, optionally, in this embodiment of the present invention, the first request message that is sent by the first sending module 110 to the mobility management control node may also be referred to as a UE initialization message, and the first request message may further include identifier information or a subscription message of UE, to help the mobility management control node determine whether to allow to perform data offloading at the LGW of the secondary base station or at the LGW of the base station 100 for the UE.

It should be further understood that, optionally, in this embodiment of the present invention, the second request message that is sent by the second sending module 120 to the mobility management control node may also be referred to as a bearer setup request message, which is not limited in this embodiment of the present invention.

Optionally, in an embodiment, the receiving module is further configured to: before the first sending module sends the first request message to the mobility management control node, receive the address of the local gateway of the secondary base station that is sent by the secondary base station.

It should be understood that the base station 100 may further acquire the address of the LGW of the secondary base station by another means, which is not limited in this embodiment of the present invention.

Therefore, according to the base station 100 in this embodiment of the present invention, the base station 100 sends an address of a local gateway of a secondary base station to a mobility management control node, and data offloading is performed at the local gateway of the secondary base station according to a related ID of the local gateway of the secondary base station that is sent by the mobility management control node, so that when a user data throughput is improved, load on a mobile network can be reduced, thereby effectively improving satisfaction in user experience.

Figure 2:
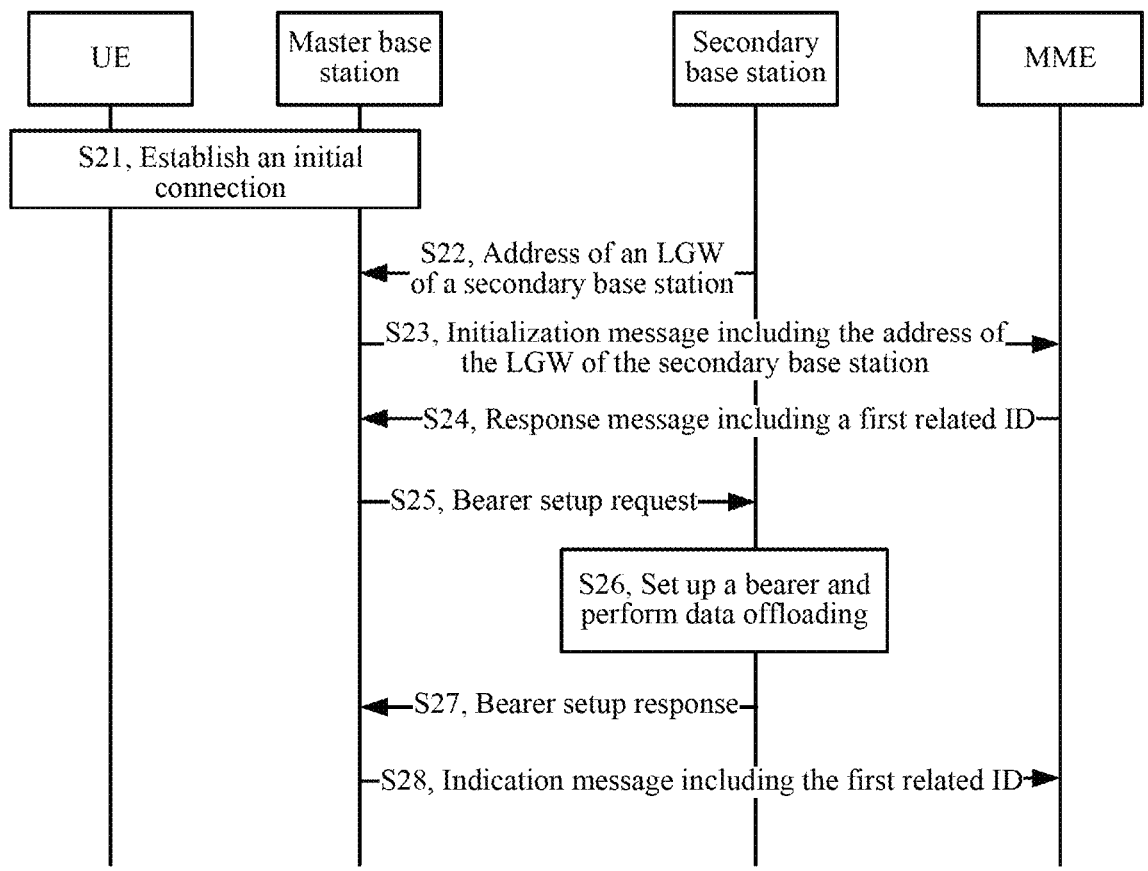
FIG. 2 is a schematic flowchart of a data offloading method according to an embodiment of the present invention.

For ease of understanding, FIG. 2 is a schematic flowchart of data offloading according to an embodiment of the present invention. Specifically, FIG. 2 shows a scenario in which an LGW of a secondary base station is a co-site LGW, and only the secondary base station performs data offloading, where a base station 100 is marked as a master base station. Using an example in which a mobility management control node is an MME, as shown in FIG. 2, in S21, UE establishes a connection to a master base station; in S22, a secondary base station SeNB sends an address of a local gateway of the SeNB to the master base station MeNB, where the local gateway is a co-site local gateway and is used for a process of connection establishment with the UE; in S23, the MeNB sends a UE initialization message to an MME, where the initialization message includes the address of the LGW of the SeNB; in S24, when determining to allow the SeNB to perform local offloading (such as SIPTO) at the LGW, the mobility management control node sends a first response message including a first related ID of the LGW of the SeNB to the MeNB; in S25, when determining to allow the SeNB to perform data offloading, the MeNB sends, to the SeNB, a bearer setup request (such as an E-RAB setup request) carrying the first related ID; in S26, the SeNB sets up a bearer according to a first bearer indicated by the first related ID, and completes data offloading; in S27, the SeNB sends, to the MeNB, a bearer setup response (such as an E-RAB setup response); and in S28, the MeNB sends an indication message including the first related ID to the MME.

Figure 3:
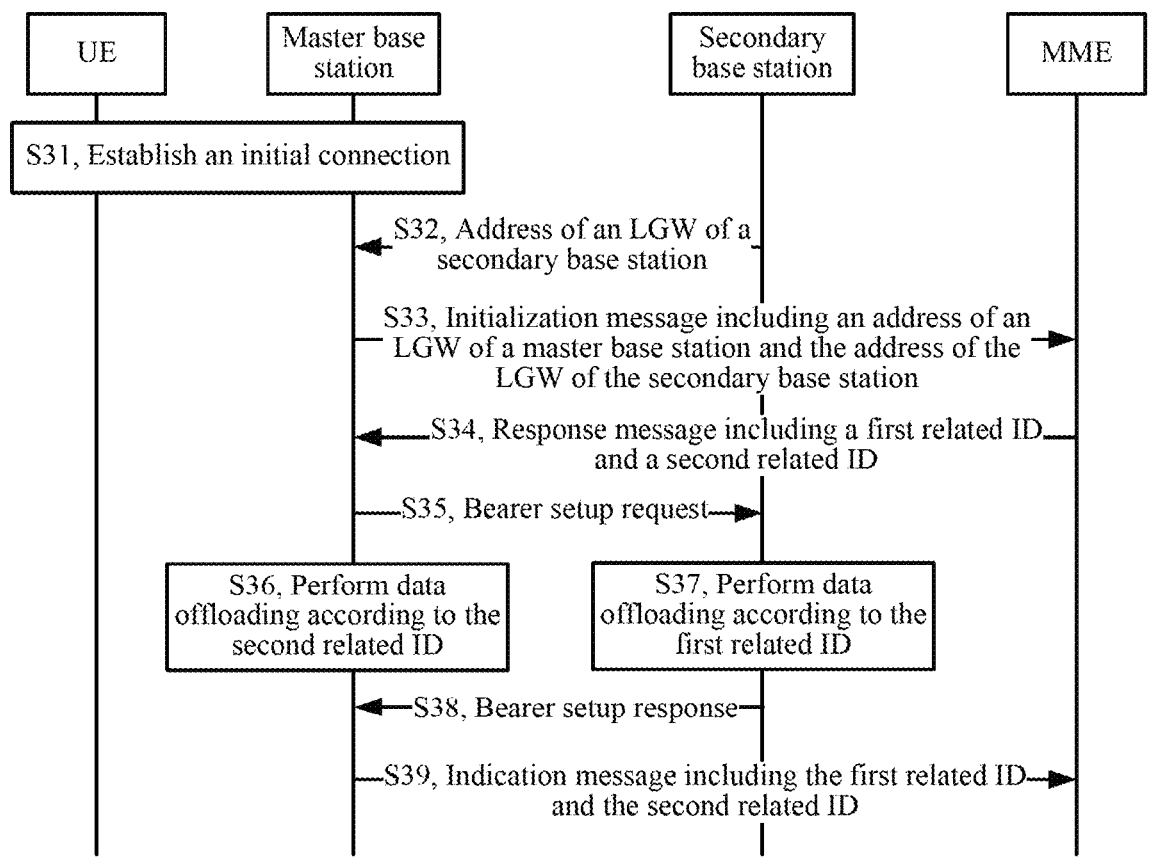
FIG. 3 is another schematic flowchart of a data offloading method according to an embodiment of the present invention.

FIG. 3 is another schematic flowchart of data offloading according to an embodiment of the present invention, where a base station 100 is marked as a master base station. Using an example in which a mobility management control node is an MME, specifically, FIG. 3 also shows a scenario in which an LGW of a secondary base station is a co-site LGW, and the master base station also has an LGW and may perform data offloading. As shown in FIG. 3, in S31, UE establishes a connection to a master base station; in S32, an SeNB sends an address of a local gateway of the SeNB to the MeNB, where the local gateway is co-sited with the SeNB; in S33, the MeNB sends a UE initialization message to a mobility management control node, where the initialization message includes the address of the LGW of the SeNB and an address of an LGW of the MeNB; in S34, when determining to allow the MeNB and the SeNB to perform data offloading at the LGW of the MeNB and at the LGW of the SeNB for the UE, the mobility management control node sends a response message including a first related ID of the LGW of the SeNB and a second related ID of the LGW of the MeNB to the MeNB; in S35, the MeNB sends a bearer setup request including the first related ID to the SeNB; in S36, the MeNB performs data offloading according to the second related ID; in S37, the SeNB performs data offloading according to the first related ID; in S38, after completing data offloading, the SENB sends, to the MeNB, a bearer setup response; in S39, after completing data offloading according to the second related ID, the MeNB sends an indication message including the first related ID and the second related ID to an MME, to notify the MME that data offloading is already respectively completed at the LGW of the secondary base station and at the LGW of the master base station according to the first related ID and the second related ID.

It should be understood that before sending the corresponding message to the master base station in S34, the mobility management control node determines, for example, according to a type of a service that the UE requests to access, or subscription information of the UE, whether to allow the master base station and the secondary base station to perform data offloading at the LGW of the master base station and at the LGW of the secondary base station for the UE.

Figure 4:
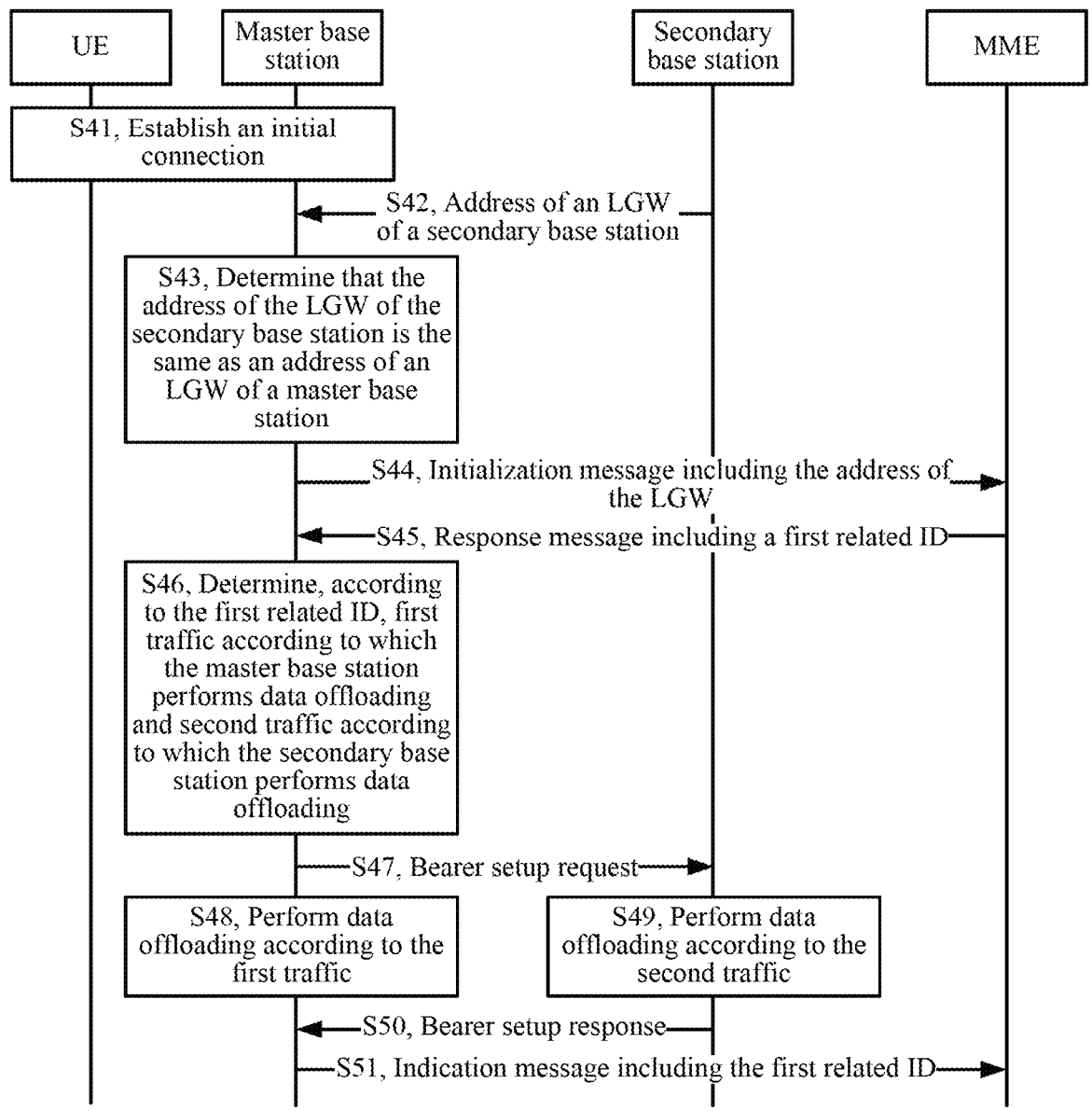
FIG. 4 is still another schematic flowchart of a data offloading method according to an embodiment of the present invention.

FIG. 4 is still another schematic flowchart of a data offloading method according to an embodiment of the present invention, where a base station 100 is marked as a master base station. Using an example in which a mobility management control node is an MME, specifically, FIG. 4 shows a scenario in which an LGW of a secondary base station is an independent LGW. As shown in FIG. 4, in S41, an SeNB sends an address of a local gateway of the SeNB to an MeNB, where the local gateway is an independent gateway B; in S42, UE sends an RRC connection establishment request to the MeNB; in S43, the MeNB determines that the address of the local gateway of the SeNB is the same as an address of an LGW of the MeNB; in S44, the MeNB sends a UE initialization message to a mobility management control node, where the initialization message includes the address of the LGW; in S45, when determining to allow to perform data offloading (such as SIPTO) at the LGW, the mobility management control node sends a first related ID of the LGW to the MeNB, where the first related ID indicates a first bearer; in S46, second traffic according to which the MeNB performs data offloading at the LGW and first traffic according to which the SeNB performs data offloading at the LGW are determined according to the first bearer indicated by the first related ID; in S47, the MeNB sends, to the SeNB, a bearer setup request used to indicate the first traffic; in S48, the MeNB performs data offloading according to the second traffic; in S49, the SeNB performs data offloading according to the first traffic; in S50, the SeNB sends, to the MeNB, a bearer setup response used to indicate that data offloading is completed; and in S51, the MeNB sends an indication message including the first related ID to an MME.

It should be understood that FIG. 2 to FIG. 4 show a situation in which data offloading is performed at a secondary base station when UE initially accesses a master base station. After the UE accesses the master base station, the master base station may further allocate another serving base station as a secondary base station to the UE. For example, the secondary base station in FIG. 2 to FIG. 4 is changed to a first secondary base station. In this scenario, the master base station needs to re-send an address of an LGW of a new secondary base station (for example, the first secondary base station) to an MME, to request to perform data offloading at the LGW of the new secondary base station, and a subsequent procedure is the same as a procedure in FIG. 2 to FIG. 4. For brevity, details are not described herein again.

It should be further understood that in a situation shown in FIG. 2 to FIG. 4 in which data offloading is performed at a secondary base station when UE initially accesses a master base station, the master base station may further add another secondary base station for the UE, for example, a second secondary base station and a third secondary base station, and request an MME to allow to perform data offloading at LGWs of the second secondary base station and the third secondary base station. Correspondingly, the master base station further needs to send addresses of the LGWs of the second secondary base station and the third secondary base station to the MME, and a subsequent procedure is the same as a procedure in FIG. 2 to FIG. 4. For brevity, details are not described herein again.

Therefore, according to the base station 100 in this embodiment of the present invention, the base station 100 sends an address of a local gateway of a secondary base station to a mobility management control node, and data offloading is performed at the local gateway of the secondary base station according to a related ID of the local gateway of the secondary base station that is sent by the mobility management control node, so that when a user data throughput is improved, load on a mobile network can be reduced, thereby effectively improving satisfaction in user experience.

It should be understood that sequence numbers of the foregoing processes do not mean execution sequences in various embodiments of the present invention. The execution sequences of the processes should be determined according to functions and internal logic of the processes, and should not be construed as any limitation to the implementation processes of the embodiments of the present invention.

The base station 100 according to the embodiment of the present invention is described in detail above with reference to FIG. 1 to FIG. 4, and another base station 200 according to an embodiment of the present invention is described in detail below with reference to FIG. 5.

Figure 5:
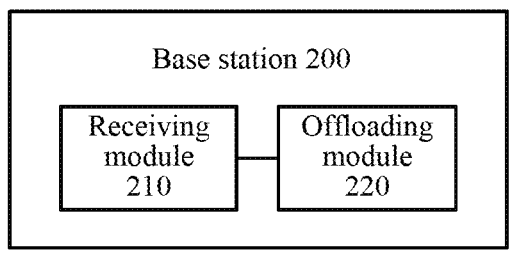
FIG. 5 is a schematic block diagram of another base station according to an embodiment of the present invention.

FIG. 5 is a schematic block diagram of a base station 200 according to an embodiment of the present invention. The base station 200 may be configured to implement data offloading. As shown in FIG. 5, the base station 200 includes: a receiving module 210 and an offloading module 220.

The receiving module 210 is configured to receive a request message sent by a master base station, where the request message includes a first related identifier ID of a local gateway of the base station 200, and the first related ID is used to indicate a first bearer according to which data offloading is performed at the local gateway of the base station 200.

The offloading module 220 is configured to perform data offloading according to the first bearer indicated by the first identifier ID that is included in the request message received by the receiving module.

Therefore, the base station 200 in this embodiment of the present invention performs data offloading according to a related ID of a local gateway of the base station 200 that is sent by a master base station, so that when a user data throughput is improved, load on a mobile network can be reduced, thereby effectively improving satisfaction in user experience.

The base station 200 performs data offloading at the LGW of the base station 200 by using the offloading module 220 according to first traffic in the request message received by the receiving module 210.

Specifically, the base station 200 acquires information about a corresponding LGW according to a related ID of a local network, and may acquire transmission address information of a data channel of the LGW. The base station 200 may perform data offloading at the corresponding LGW according to the transmission address information and the first traffic received by the receiving module 210.

Optionally, in an embodiment, the local gateway of the base station 200 is a co-site local gateway or an independent local gateway.

Optionally, in an embodiment, the base station 200 further includes:

a first sending module 230, configured to: before the receiving module receives the request message sent by the master base station, send an address of the local gateway of the base station 200 to the master base station, so that the master base station sends the address of the local gateway of the base station 200 to the mobility management control node, to request to perform data offloading.

Optionally, in an embodiment, the base station 200 further includes:

a second sending module 240, configured to: when data offloading is completed according to the request message received by the receiving module, send, to the master base station, a response message used to indicate that data offloading is completed.

Specifically, specific actions of the receiving module 210, the offloading module 220, the first sending module 230, and the second sending module 240 of the base station 200 may be the same as actions shown in FIG. 2 to FIG. 4. For brevity, a detailed procedure is not described herein again.

Therefore, the base station 200 in this embodiment of the present invention performs data offloading according to a related ID of a local gateway of the base station 200 that is sent by a master base station, so that when a user data throughput is improved, load on a mobile network can be reduced, thereby effectively improving satisfaction in user experience.

It should be understood that sequence numbers of the foregoing processes do not mean execution sequences in various embodiments of the present invention. The execution sequences of the processes should be determined according to functions and internal logic of the processes, and should not be construed as any limitation to the implementation processes of the embodiments of the present invention.

Figure 6:
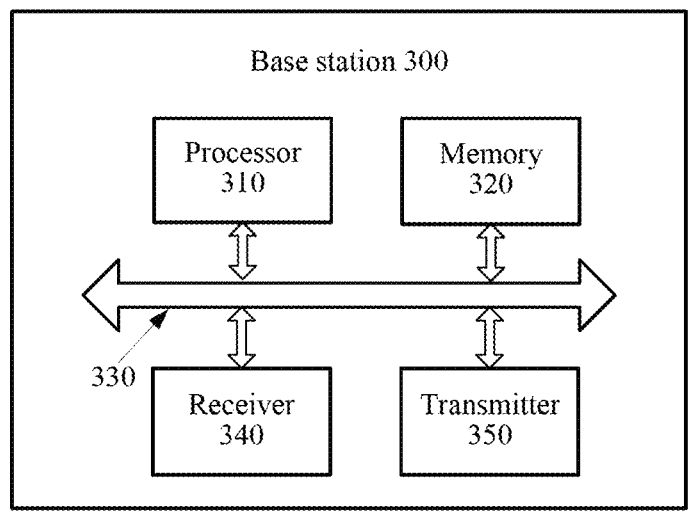
FIG. 6 is a schematic block diagram of a base station according to an embodiment of the present invention.

As shown in FIG. 6, an embodiment of the present invention further provides a base station 300. The base station 300 includes a processor 310, a memory 320, a bus system 330, a receiver 340, and a transmitter 350. The processor 310, the memory 320, the receiver 340, and the transmitter 350 are connected by using the bus system 330. The memory 320 is configured to store an instruction. The processor 310 is configured to execute the instruction stored in memory 320, to control the receiver 340 to receive a signal, and control the transmitter 350 to send a signal. The transmitter 350 is configured to send a first request message to a mobility management control node, where the first request message includes an address of a local gateway of a secondary base station, and the first request message is used to request to perform data offloading at the local gateway of the secondary base station.

The receiver 340 is configured to receive a first response message that is sent by the mobility management control node according to the first request message sent by the transmitter 350, where the first response message includes a first related identifier ID of the local gateway of the secondary base station, and the first related ID is used to indicate a first bearer according to which data offloading is performed at the local gateway of the secondary base station.

The transmitter 350 is further configured to send a second request message including the first related ID to the secondary base station according to the first response message received by the receiver 340, to instruct the secondary base station to perform data offloading at the local gateway of the secondary base station according to the first bearer.

Therefore, according to the base station 300 in this embodiment of the present invention, the base station 300 sends an address of a local gateway of a secondary base station to a mobility management control node, and data offloading is performed at the local gateway of the base station according to a related ID of the local gateway of the secondary base station that is sent by the mobility management control node, so that when a user data throughput is improved, load on a mobile network can be reduced, thereby effectively improving satisfaction in user experience.

It should be understood that in this embodiment of the present invention, the processor 310 may be a central processing unit (Central Processing Unit, "CPU" for short), or the processor 310 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor and the like.

The memory 320 may include a read-only memory and a random access memory, and provides an instruction and data to the processor 310. A part of the memory 320 may further include a non-volatile random access memory. For example, the memory 320 may further store device type information.

The bus system 330 may include a power bus, a control bus, a status signal bus, and the like in addition to a data bus. However, for clear description, various types of buses in the figure are marked as the bus system 330.

In an implementation process, steps of the foregoing methods may be performed by using an integrated logic circuit of hardware in the processor 310 or an instruction in a form of software. Steps of the methods disclosed with reference to the embodiments of the present invention may be directly performed and completed by means of a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 320, and the processor 310 reads information in the memory 320 and completes the steps in the foregoing methods in combination with hardware of the processor 310. To avoid repetition, details are not described herein again.

Optionally, in an embodiment, the transmitter 350 is specifically configured to send the first request message to the mobility management control node when it is determined that the local gateway of the secondary base station is a co-site local gateway.

Optionally, in an embodiment,
the processor 310 is configured to determine that the local gateway of the secondary base station is an independent local gateway; and
the transmitter 350 is specifically configured to send the first request message to the mobility management control node when it is determined that the address of the local gateway of the secondary base station is the same as an address of a local gateway of the base station 300.

Optionally, in an embodiment, the second request message sent by the transmitter 350 is further used to instruct the secondary base station to perform data offloading according to all traffic of the first bearer.

Optionally, in an embodiment, the transmitter 350 is further configured to: in a case in which it is determined that the transmitter 350 receives a response message that is sent by the secondary base station and that is used to indicate that the secondary base station completes data offloading according to all the traffic of the first bearer, send a first indication message to the mobility management control node, where the first indication message is used to indicate that data offloading is completed at the local gateway of the secondary base station according to the first bearer.

Optionally, in an embodiment,
the processor 310 is configured to determine, according to the first bearer that is indicated by the first related ID in the first response message, first traffic according to which data offloading is performed at the local gateway of the secondary base station and second traffic according to which data offloading is performed at the local gateway of the base station 300, where a sum of the first traffic and the second traffic does not exceed all traffic of the first bearer;
the transmitter 350 is configured to send the second request message to the secondary base station according to the first traffic determined by the processor 310; and
the processor 350 is further configured to perform data offloading at the local gateway of the base station 300 according to the second traffic.

Optionally, in an embodiment, the transmitter 350 is further configured to: in a case in which it is determined that data offloading is completed according to the second traffic and it is determined that the receiver receives a response message that is sent by the secondary base station and that is used to indicate that the secondary base station completes data offloading according to the first traffic, send a second indication message to the mobility management control node, where the second indication message is used to indicate that data offloading is completed at the local gateway of the secondary base station according to the first bearer.

Optionally, in an embodiment,
the first request message sent by the transmitter 350 further includes an address of a local gateway of the base station 300, and the first request message is further used to request to perform data offloading at the local gateway of the base station 300;
the first response message received by the receiver 340 further includes a second related ID of the local gateway of the base station 300, and the second related ID is used to indicate a second bearer according to which data offloading is performed at the local gateway of the base station 300; and
the processor 310 is configured to perform data offloading at the local gateway of the base station 300 according to the second bearer that is indicated by the second related ID in the first response message received by the receiver 340.

Optionally, in an embodiment, the transmitter 350 is further configured to: in a case in which it is determined that data offloading is completed according to the second bearer and it is determined that the receiving module receives a fourth response message that is sent by the secondary base station and that is used to indicate that the secondary base station completes data offloading according to the first bearer, send a third indication message to the mobility management control node, where the third indication message is used to indicate that local offloading is separately completed according to the first bearer and the second bearer.

Optionally, in an embodiment, the receiver 340 is further configured to: before the transmitter 350 sends the first request message to the mobility management control node, receive the address of the local gateway of the secondary base station that is sent by the secondary base station.

It should be understood that the base station 300 according to this embodiment of the present invention corresponds to the base station 100 according to the embodiment of the present invention, and the foregoing and other operations and/or functions of the modules in the base station 300 are separately used to implement corresponding procedures of the methods in FIG. 2 and FIG. 4. For brevity, details are not described herein again.

Therefore, according to the base station 300 in this embodiment of the present invention, the base station 300 sends an address of a local gateway of a secondary base station to a mobility management control node, and data offloading is performed at the local gateway of the base station according to a related ID of the local gateway of the secondary base station that is sent by the mobility management control node, so that when a user data throughput is improved, load on a mobile network can be reduced, thereby effectively improving satisfaction in user experience.

Figure 7:
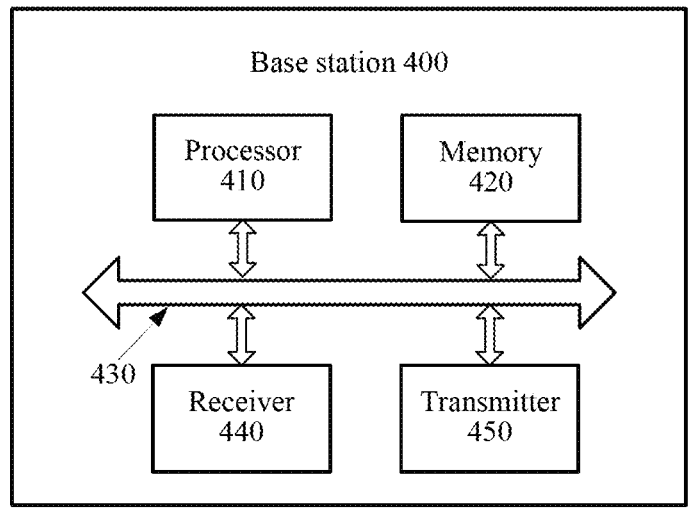
FIG. 7 is a schematic block diagram of another base station according to an embodiment of the present invention.

As shown in FIG. 7, an embodiment of the present invention further provides a base station 400. The base station 400 includes a processor 410, a memory 420, a bus system 430, a receiver 440, and a transmitter 450. The processor 410, the memory 420, the receiver 440, and the transmitter 450 are connected by using the bus system 430. The memory 420 is configured to store an instruction. The processor 410 is configured to execute the instruction stored in memory 420, to control the receiver 440 to receive a signal, and control the transmitter 450 to send a signal. The receiver 440 is configured to receive a request message sent by a master base station, where the request message includes a first related identifier ID of a local gateway of the secondary base station, and the first related ID is used to indicate a first bearer according to which data offloading is performed at the local gateway of the secondary base station. The processor 410 is configured to perform data offloading according to the first bearer indicated by the first identifier ID that is included in the request message received by the receiver 440.

Therefore, the base station 400 in this embodiment of the present invention performs data offloading according to a related ID of a local gateway of a base station 400 that is sent by a master base station, so that when a user data throughput is improved, load on a mobile network can be reduced, thereby effectively improving satisfaction in user experience.

It should be understood that in this embodiment of the present invention, the processor 410 may be a central processing unit (Central Processing Unit, "CPU" for short), or the processor 410 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor and the like.

The memory 420 may include a read-only memory and a random access memory, and provides an instruction and data to the processor 410. A part of the memory 420 may further include a non-volatile random access memory. For example, the memory 420 may further store device type information.

The bus system 430 may include a power bus, a control bus, a status signal bus, and the like in addition to a data bus. However, for clear description, various types of buses in the figure are marked as the bus system 430.

In an implementation process, steps of the foregoing methods may be performed by using an integrated logic circuit of hardware in the processor 410 or an instruction in a form of software. Steps of the methods disclosed with reference to the embodiments of the present invention may be directly performed and completed by means of a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 420, and the processor 410 reads information in the memory 420 and completes the steps in the foregoing methods in combination with hardware of the processor 410. To avoid repetition, details are not described herein again.

Optionally, in an embodiment, the local gateway of the base station 400 is a co-site local gateway or an independent local gateway.

Optionally, in an embodiment, the transmitter 450 is configured to: before the receiver 440 receives the request message sent by the master base station, send an address of the local gateway of the base station 400 to the master base station, so that the master base station sends the address of the local gateway of the base station 400 to the mobility management control node, to request to perform data offloading.

Optionally, in an embodiment, the transmitter 450 is further configured to: when data offloading is completed according to the request message received by the receiver 440, send, to the master base station, a response message used to indicate that data offloading is completed.

It should be understood that the base station 400 according to this embodiment of the present invention may correspond to the base station 200 according to the embodiment of the present invention, and the foregoing and other operations and/or functions of the modules in the base station 400 are separately used to implement corresponding procedures of the methods in FIG. 2 and FIG. 4. For brevity, details are not described herein again.

Therefore, the base station 400 in this embodiment of the present invention performs data offloading according to a related ID of a local gateway of a base station 400 that is sent by a master base station, so that when a user data throughput is improved, load on a mobile network can be reduced, thereby effectively improving satisfaction in user experience.

The data offloading apparatuses (the base station 100, the base station 200, the base station 300, and the base station 400) according to the embodiments of the present inventions are described in detail above with reference to FIG. 1 to FIG. 7, and data offloading methods according to embodiments of the present invention are described in detail below with reference to FIG. 8 and FIG. 9.

Figure 8:
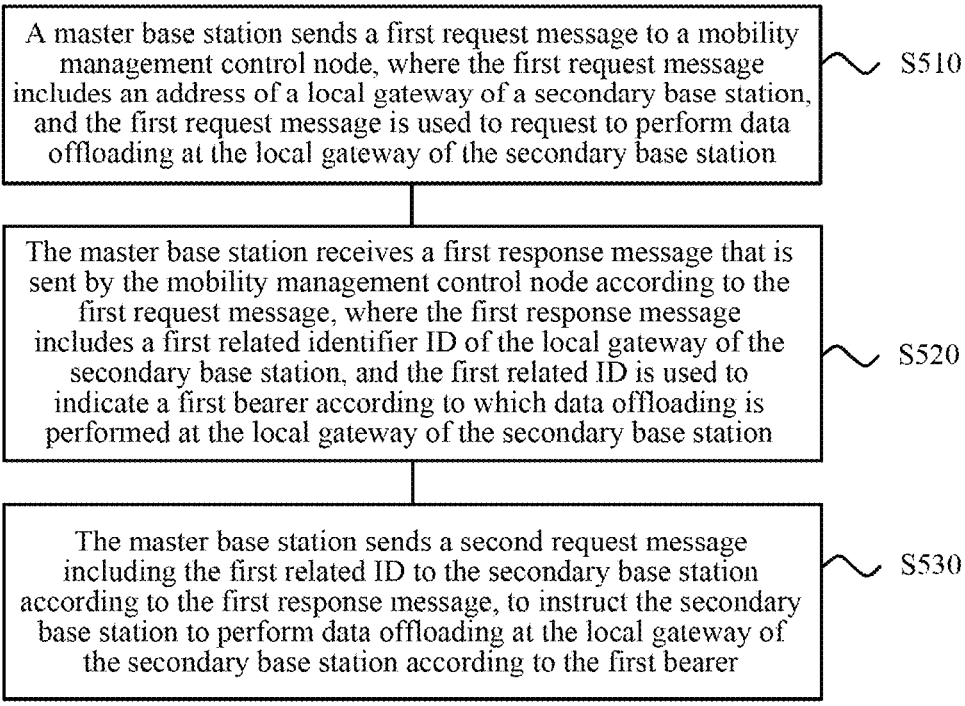
FIG. 8 is still another schematic flowchart of a data offloading method according to an embodiment of the present invention.

FIG. 8 is a schematic flowchart of a data offloading method 500 according to an embodiment of the present invention. The method 500 may be performed by, for example, a master base station, and the master base station may be the base station 100 or the base station 300. As shown in FIG. 8, the method includes:

S510: A master base station sends a first request message to a mobility management control node, where the first request message includes an address of a local gateway of a secondary base station, and the first request message is used to request to perform data offloading at the local gateway of the secondary base station.

S520: The master base station receives a first response message that is sent by the mobility management control node according to the first request message, where the first response message includes a first related identifier ID of the local gateway of the secondary base station, and the first related ID is used to indicate a first bearer according to which data offloading is performed at the local gateway of the secondary base station.

S530: The master base station sends a second request message including the first related ID to the secondary base station according to the first response message, to instruct the secondary base station to perform data offloading at the local gateway of the secondary base station according to the first bearer.

Therefore, according to the data offloading method in this embodiment of the present invention, a master base station sends an address of a local gateway of a secondary base station to a mobility management control node, and data offloading is performed at the local gateway of the secondary base station according to a related ID of the local gateway of the secondary base station that is sent by the mobility management control node, so that when a user data throughput is improved, load on a mobile network can be reduced, thereby effectively improving satisfaction in user experience.

Optionally, in an embodiment, the sending, by a master base station, a first request message to a mobility management control node includes:

sending, by the master base station, the first request message to the mobility management control node when determining that the local gateway of the secondary base station is a co-site local gateway; and the sending, by the master base station, a second request message including the first related ID to the secondary base station according to the first response message includes:

sending, by the master base station, the second request message to the secondary base station, where the second request message is used to instruct the secondary base station to perform data offloading according to all traffic of the first bearer.

Optionally, as an embodiment, the method further includes:

in a case in which the master base station determines that the master base station receives a response message that is sent by the secondary base station and that is used to indicate that the secondary base station completes data offloading according to all the traffic of the first bearer, sending, by the master base station, a first indication message to the mobility management control node, where the first indication message is used to indicate that data offloading is completed at the local gateway of the secondary base station according to the first bearer.

Specifically, as shown in FIG. 2, in S21, UE establishes a connection to a master base station; in S22, a secondary base station SeNB sends an address of a local gateway of the SeNB to the master base station MeNB, where the local gateway is a co-site local gateway and is used for a process of connection establishment with the UE; in S23, the MeNB sends a UE initialization message to an MME, where the initialization message includes the address of the LGW of the SeNB; in S24, when determining to allow the SeNB to perform local offloading (such as SIPTO) at the LGW, the mobility management control node sends a response message including a first related ID of the LGW of the SeNB to the MeNB; in S25, when determining to allow the SeNB to perform data offloading, the MeNB sends, to the SeNB, a bearer setup request (such as an E-RAB setup request) carrying the first related ID; in S26, the SeNB sets up a bearer according to a first bearer indicated by the first related ID, and completes data offloading; in S27, the SeNB sends, to the MeNB, a bearer setup response (such as an E-RAB setup response); and in S28, the MeNB sends an indication message including the first related ID to the MME.

Optionally, in an embodiment, the sending, by a master base station, a first request message to a mobility management control node includes:

determining, by the master base station, that the local gateway of the secondary base station is an independent local gateway; and when determining that the address of the local gateway of the secondary base station is the same as an address of a local gateway of the master base station, sending, by the master base station, the first request message to the mobility management control node.

Optionally, in an embodiment, the sending, by the master base station, a second request message including the first related ID to the secondary base station according to the first response message includes:

sending, by the master base station, the second request message to the secondary base station, where the second request message is used to instruct the secondary base station to perform data offloading according to all traffic of the first bearer.

Optionally, as an embodiment, the method further includes:

in a case in which the master base station determines that the master base station receives a response message that is sent by the secondary base station and that is used to indicate that the secondary base station completes data offloading according to all the traffic of the first bearer, sending, by the master base station, a first indication message to the mobility management control node, where the first indication message is used to indicate that data offloading is completed at the local gateway of the secondary base station according to the first bearer.

Optionally, in an embodiment, the sending, by the master base station, a second request message including the first related ID to the secondary base station according to the first response message includes:

determining, by the master base station according to the first bearer that is indicated by the first related ID in the first response message, first traffic according to which data offloading is performed at the local gateway of the secondary base station and second traffic according to which data offloading is performed at the local gateway of the master base station, where a sum of the first traffic and the second traffic does not exceed all traffic of the first bearer; and sending, by the master base station, the second request message to the secondary base station, where the second request message further includes the first traffic, and is used to instruct the secondary base station to perform data offloading at the local gateway of the secondary base station according to the first traffic; and the method further includes:

performing, by the master base station, data offloading at the local gateway of the master base station according to the second traffic.

Optionally, in an embodiment, the method further includes: in a case in which the master base station determines that data offloading is completed according to the second traffic, and determines that the master base station receives a response message that is sent by the secondary base station and that is used to indicate that the secondary base station completes data offloading according to the first traffic, sending, by the master base station, a second indication message to the mobility management control node, where the second indication message is used to indicate that data offloading is completed at the local gateway of the secondary base station according to the first bearer.

Specifically, FIG. 4 is still another schematic flowchart of a data offloading method according to an embodiment of the present invention. Using an example in which a mobility management control node is an MME, specifically, FIG. 4 shows a scenario in which an LGW of a secondary base station is an independent LGW. As shown in FIG. 4, in S41, an SeNB sends an address of a local gateway of the SeNB to an MeNB, where the local gateway is an independent gateway B; in S42, UE sends an RRC connection establishment request to the MeNB; in S43, the MeNB determines that the address of the local gateway of the SeNB is the same as an address of an LGW of the MeNB; in S44, the MeNB sends a UE initialization message to a mobility management control node, where the initialization message includes the address of the LGW; in S45, when determining to allow to perform data offloading (such as SIPTO) at the LGW, the mobility management control node sends a first related ID of the LGW to the MeNB, where the first related ID indicates a first bearer; in S46, second traffic according to which the MeNB performs data offloading at the LGW and first traffic according to which the SeNB performs data offloading at the LGW are determined according to the first bearer indicated by the first related ID; in S47, the MeNB sends, to the SeNB, a bearer setup request used to indicate the first traffic; in S48, the MeNB performs data offloading according to the second traffic; in S49, the SeNB performs data offloading according to the first traffic; in S50, the SeNB sends, to the MeNB, a bearer setup response used to indicate that data offloading is completed; and in S51, the MeNB sends an indication message including the first related ID to an MME.

Optionally, in an embodiment, the sending, by the master base station, the first request message to the mobility management control node when determining that the local gateway of the secondary base station is a co-site local gateway includes:

sending, by the master base station, the first request message to the mobility management control node, where the first request message includes an address of a local gateway of the master base station, and the first request message is further used to request to perform data offloading at the local gateway of the master base station;

the receiving, by the master base station, a first response message that is sent by the mobility management control node according to the first request message includes:

receiving, by the master base station, the first response message, where the first response message further includes a second related ID of the local gateway of the master base station, and the second related ID is used to indicate a second bearer according to which data offloading is performed at the local gateway of the master base station; and the method further includes:

performing, by the master base station, data offloading at the local gateway of the master base station according to the second bearer indicated by the second related ID.

Optionally, in an embodiment, the method further includes:

in a case in which the master base station determines that data offloading is completed according to the second bearer, and determines that the master base station receives a fourth response message that is sent by the secondary base station and that is used to indicate that the secondary base station completes data offloading according to the first bearer, sending, by the master base station, a third indication message to the mobility management control node, where the third indication message is used to indicate that local offloading is separately completed according to the first bearer and the second bearer.

Specifically, as shown in FIG. 3, in S31, UE establishes a connection to a master base station; in S32, an SeNB sends an address of a local gateway of the SeNB to the MeNB, where the local gateway is co-sited with the SeNB; in S33, the MeNB sends a UE initialization message to a mobility management control node, where the initialization message includes the address of the LGW of the SeNB and an address of an LGW of the MeNB; in S34, when determining to allow the MeNB and the SeNB to perform data offloading at the LGW of the MeNB and at the LGW of the SeNB for the UE, the mobility management control node sends a response message including a first related ID of the LGW of the SeNB and a second related ID of the LGW of the MeNB to the MeNB; in S35, the MeNB sends a bearer setup request including the first related ID to the SeNB; in S36, the MeNB performs data offloading according to the second related ID; in S37, the SeNB performs data offloading according to the first related ID; in S38, after completing data offloading, the SENB sends, to the MeNB, a bearer setup response; in S39, after completing data offloading according to the second related ID, the MeNB sends an indication message including the first related ID and the second related ID to an MME, to notify the MME that data offloading is already respectively completed at the LGW of the secondary base station and at the LGW of the master base station according to the first related ID and the second related ID.

It should be understood that before sending the corresponding message to the master base station in S34, the mobility management control node determines, for example, according to a type of a service that the UE requests to access, or subscription information of the UE, whether to allow the master base station and the secondary base station to perform data offloading at the LGW of the master base station and at the LGW of the secondary base station for the UE.

Optionally, in an embodiment, before the sending, by a master base station, a first request message to a mobility management control node, the method further includes:

receiving, by the master base station, the address of the local gateway of the secondary base station that is sent by the secondary base station.

It should be understood that sequence numbers of the foregoing processes do not mean execution sequences in various embodiments of the present invention. The execution sequences of the processes should be determined according to functions and internal logic of the processes, and should not be construed as any limitation to the implementation processes of the embodiments of the present invention.

Therefore, according to the data offloading method in this embodiment of the present invention, a master base station sends an address of a local gateway of a secondary base station to a mobility management control node, and data offloading is performed at the local gateway of the secondary base station according to a related ID of the local gateway of the secondary base station that is sent by the mobility management control node, so that when a user data throughput is improved, load on a mobile network can be reduced, thereby effectively improving satisfaction in user experience.

It should be understood that the master base station in the data offloading method 100 according to this embodiment of the present invention may correspond to the base station 100 or the base station 300 in the embodiment of the present invention.

The data offloading method according to this embodiment of the present inventions is described in detail above from the perspective of a master base station with reference to FIG. 8, and a data offloading method 600 according to an embodiment of the present invention is described in detail below from the perspective of a secondary base station with reference to FIG. 9.

Figure 9:
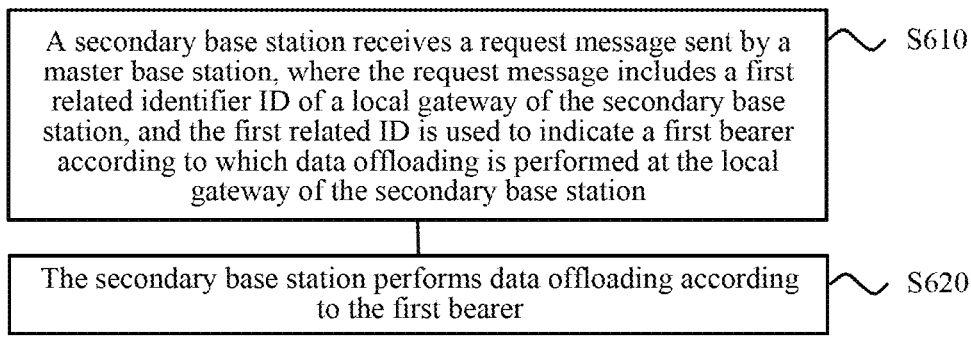
FIG. 9 is still another schematic flowchart of a data offloading method according to an embodiment of the present invention.

FIG. 9 is a schematic flowchart of a data offloading method 600 according to an embodiment of the present invention. The method 200 may be performed by, for example, a secondary base station, and the secondary base station may be the base station 200 or the base station 400. As shown in FIG. 9, the method 600 includes:

S610: A secondary base station receives a request message sent by a master base station, where the request message includes a first related identifier ID of a local gateway of the secondary base station, and the first related ID is used to indicate a first bearer according to which data offloading is performed at the local gateway of the secondary base station.

S620: The secondary base station performs data offloading according to the first bearer.

Therefore, according to the data offloading method in this embodiment of the present invention, a master base station sends an address of a local gateway of a secondary base station to a mobility management control node, and data offloading is performed at the local gateway of the secondary base station according to a related ID of the local gateway of the secondary base station that is sent by the mobility management control node, so that when a user data throughput is improved, load on a mobile network can be reduced, thereby effectively improving satisfaction in user experience.

Optionally, in an embodiment, the local gateway of the secondary base station is a co-site local gateway or an independent local gateway.

Optionally, in an embodiment, before the receiving, by a secondary base station, a request message sent by a master base station, the method further includes:

sending, by the secondary base station, an address of the local gateway of the secondary base station to the master base station, so that the master base station sends the address of the local gateway of the secondary base station to the mobility management control node, to request to perform data offloading.

Optionally, in an embodiment, the method further includes:

when completing data offloading according to the request message, sending, by the secondary base station to the master base station, a response message used to indicate that data offloading is completed.

A specific procedure is the same as a procedure shown in FIG. 2 to FIG. 4. For brevity, details are not described herein again.

It should be understood that sequence numbers of the foregoing processes do not mean execution sequences in various embodiments of the present invention. The execution sequences of the processes should be determined according to functions and internal logic of the processes, and should not be construed as any limitation to the implementation processes of the embodiments of the present invention.

Therefore, according to the data offloading method in this embodiment of the present invention, a master base station sends an address of a local gateway of a secondary base station to a mobility management control node, and data offloading is performed at the local gateway of the secondary base station according to a related ID of the local gateway of the secondary base station that is sent by the mobility management control node, so that when a user data throughput is improved, load on a mobile network can be reduced, thereby effectively improving satisfaction in user experience.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation to the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data offloading method, comprising:
    sending, by a secondary base station to a master base station, an address of a local gateway of the secondary base station, wherein the local gateway of the secondary base station is a co-site local gateway;
    receiving, by the master base station from the secondary base station, the address of the local gateway of the secondary base station;
    determining that the address of the local gateway of the secondary base station is the same as an address of a local gateway of the master base station;
    sending, by the master base station to a mobility management control node, the address of the local gateway of the secondary base station to request for data offloading and information indicating to the mobility management control node that it is allowed to perform data offloading at the local gateway of the secondary base station and the local gateway of the master base station;
    receiving, by the master base station from the mobility management control node, a response message include a first related identifier (ID) of the local gateway of the secondary base station;
    determining, by the master base station, first traffic according to which data offloading is performed at the local gateway of the secondary base station and second traffic according to which data offloading is performed at the local gateway of the master base station, wherein a sum of the first traffic and the second traffic does not exceed all traffic of the first bearer;
    sending, by the master base station to the secondary base station, a request message comprising the first related ID of the local gateway of the secondary base station, and the first related ID is used to indicate data offloading to be performed at the local gateway of the secondary base station;
    receiving, by the secondary base station, the request message; and
    performing, by the secondary base station, data offloading on the first traffic according to the first bearer.

2. The method according to claim 1, further comprising receiving, by the master base station from a user equipment, a connection establishment request.

3. The method according to claim 1, further comprising performing, by the master base station, data offloading on the second traffic.

4. The method according to claim 1, further comprising:
    when completing data offloading according to the request message, sending, by the secondary base station to the master base station, a response message used to indicate that data offloading is completed.

5. The method according to claim 1, further comprising:
    allocating, by the master base station, another serving base station as a new secondary base station to a user equipment; and
    sending, by the master base station to the mobility management control node, an address of a local gateway of the new secondary base station to request for data offloading at the local gateway of the new secondary base station.

6. A system comprising:
    a master base station; and
    a secondary base station;
    wherein the secondary base station is configured to send, to the master base station, an address of a local gateway of the secondary base station, wherein the local gateway of the secondary base station is a co-site local gateway;
    wherein the master base station is configured to:
        receive, from the secondary base station, the address of the local gateway of the secondary base station;
        determining that the address of the local gateway of the secondary base station is the same as an address of a local gateway of the master base station;
        send, to a mobility management control node, the address of the local gateway of the secondary base station to request for data offloading and information indicating to the mobility management control node that it is allowed to perform data offloading at the local gateway of the secondary base station and the local gateway of the master base station;
        receive, from the mobility management control node, a response message include a first related identifier (ID) of the local gateway of the secondary base station;
        determine first traffic according to which data offloading is performed at the local gateway of the secondary base station and second traffic according to which data offloading is performed at the local gateway of the master base station, wherein a sum of the first traffic and the second traffic does not exceed all traffic of the first bearer;
        send, to the secondary base station, a request message comprising the first related ID of the local gateway of the secondary base station, and the first related ID is used to indicate data offloading to be performed at the local gateway of the secondary base station;
    wherein the secondary base station is further configured to:
        receive the request message; and
        perform data offloading on first traffic according to the first bearer.

7. The system according to claim 6, wherein the master base station is further configured to receive, from a user equipment, a connection establishment request.

8. The system according to claim 6, wherein the master base station is further configured to perform data offloading on the second traffic.

9. The system according to claim 6, wherein the secondary base station is further configured to:
when completing data offloading according to the request message, send, to the master base station, a response message used to indicate that data offloading is completed.

10. The system according to claim 6, wherein the master base station is further configured to:
allocate another serving base station as a new secondary base station to a user equipment; and
send, to the mobility management control node, an address of a local gateway of the new secondary base station to request for data offloading at the local gateway of the new secondary base station.

* * * * *